Figure 1:
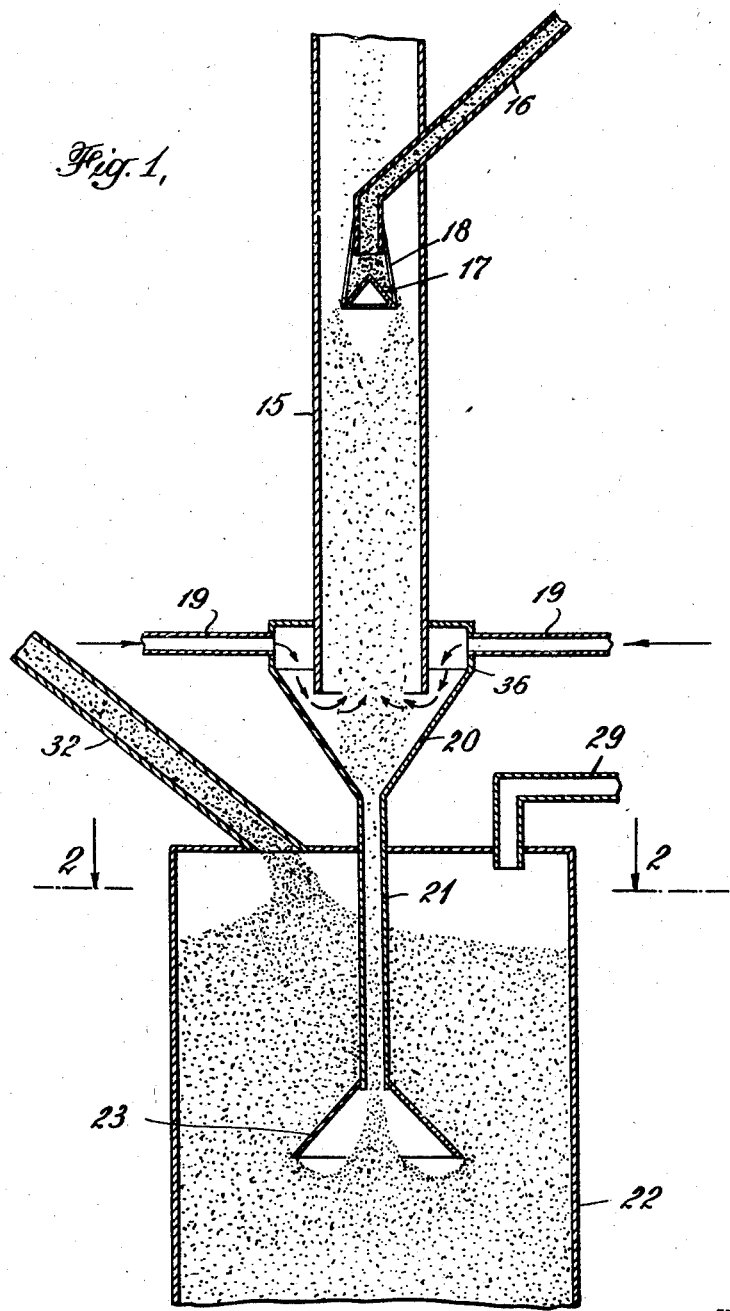

June 10, 1947.  C. H. LECHTHALER ET AL  2,421,840
CLEANING OF CONTACT MASSES BY GASEOUS SUSPENSION AND
DELIVERY THEREOF TO A DOWNWARDLY MOVING BED
Filed July 8, 1943  3 Sheets-Sheet 1

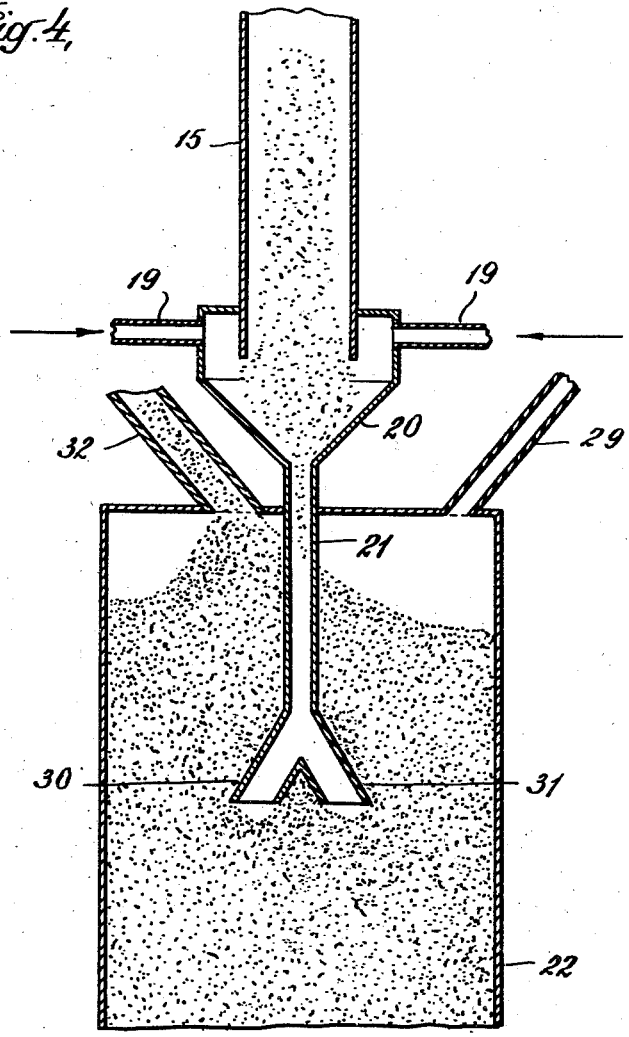

Patented June 10, 1947

2,421,840

UNITED STATES PATENT OFFICE 2,421,840

CLEANING OF CONTACT MASSES BY GASEOUS SUSPENSION AND DELIVERY THEREOF TO A DOWNWARDLY MOVING BED

Charles H. Lechthaler and John W. Payne, Woodbury, N. J., assignors to Socony-Vacuum Oil Company, Incorporated, a corporation of New York Application July 8, 1943, Serial No. 493,842

2 Claims. (Cl. 209—133)

This invention has to do with methods useful in connection with the removal of undersized solid contact material from the particle form solid contact material used as a contact mass in the conduction of certain reactions. As an exemplary reaction is the cracking conversion of hydrocarbons in which hydrocarbons of a gas oil nature boiling between 500° F. and about 750° F. are substantially cracked to gasoline and lighter hydrocarbons by passing them at reaction conditions of temperature and pressure such as for example, temperatures of the order of 800° F. and above at pressures somewhat above atmospheric in contact with a solid adsorptive catalytic contact mass. Usually such contact masses partake of the nature of fuller's earth, or other natural or treated filtering clays and/or various synthetic associations of alumina, silica, or alumina and silica, any of which may or may not have other constituents added for purposes in connection with the process involved. In a most recent form this operation has been developed as one in which a particle form solid contact mass material, of a definite range of size, is moved cyclically through two zones in the first of which it is subjected to reaction and in the second of which it is subjected to the action of a fluid regenerating medium, such as a combustion supporting gas, acting to burn off contaminant materials deposited upon the contact mass during reaction. The cyclic transfer of the contact material from one zone to the other generally involves the use of elevators or other well known particle form solid material conveyors and the use of surge hoppers or zones above the reaction and regeneration vessels. A substantially continuous bed of contact material is maintained in these surge zones and the levels of the surface of such beds in said surge zones are controlled within set limits by the use of flow throttling devices inserted in the contact material exit pipes from the reactor and regenerator vessels or by means of control of the elevator rates, etc. In its cyclic travel through such a system as above described the particle form contact material is subject to a limited amount of attrition which results in the gradual decrease in size of some of the particles of contact material and the gradual accumulation in the mass of particle form contact material of a certain amount of undersized contact material, the presence of too much of which is detrimental to the satisfactory operation of the process.

This invention has specifically to do with operations used for the removal of undesirable undersized contact material from the particle form contact mass material circulated cyclically through a process of the type above described. Several types of solid material classifiers are well known to the art such as, for example, mechanically vibrated screens and variable efficiency cyclone separators of the types used in conjunction with the Raymond grinding and pulverizing mill. Another method for accomplishing the removal of undersized material from a quantity of particle form contact material, which method has been found very well adapted for use in connection with cyclic reactor-regenerator systems, is the countercurrent scrubbing of a downward raining stream of the contact material with a stream of gas or vapor such as air or flue gas. In this operation all or part of the cyclically flowing contact material may be vented from some part of the cracking and regenerating process and, without cooling from the reaction temperature of the system, caused to fall as a dense rain down through a vertical tower countercurrent to a stream of air or flue gas passing upwards through the tower at a velocity sufficient to float and carry out the undersized contact material. The undersized material is thus carried out from the top of the tower in an air or flue gas stream, from which it may be later separated by conventional methods, and the scrubbed contact material within the usable size range settles to the bottom of the tower and is drained therefrom back into a suitable part of the cyclic-cracking-regenerating system. This contact material scrubbing apparatus has been called an elutriator and will hereinafter in the explanation and in the claiming of this invention be referred to by that term.

It has been found convenient to drain the scrubbed solid contact material from the elutriator into either the cyclic system reactor or regenerator surge hopper situated above these vessels, to the top of which hopper is charged that fraction of the total contact material circulation, generally 80 to 95%, that is not vented through the elutriator. These hoppers are made of relatively large cross sectional area so that the linear rate of contact material flow down therethrough will be very low, thereby allowing sufficient time lag for making necessary flow rate adjustments of contact material flowing to and from said hoppers without danger of emptying or flooding the hoppers thus permitting a continuous maintenance of a level of contact material in the hoppers within certain limiting ranges. Since the function and operations of this invention is the same whether the elutriator is positioned over the regenerator surge hopper so that the scrubbed contact material drains into said hopper, or whether the elutriator is positioned over and the scrubbed contact material drains into any other hopper or vessel, regardless of its exact purpose or use, in which hopper or vessel a bed of contact material is maintained between limiting levels and through which the flow of contact material is similar to that in the regenerating hopper, the term regenerator surge hopper will hereinafter in the explanation of the invention and in claiming the invention be used in a sense sufficiently broad to include the latter meaning.

The conventional method for draining the scrubbed contact material from the elutriator to the regenerator surge hopper would be to extend a drain pipe from the elutriator into the surge hopper, which pipe would terminate above the level of the contact material in the hopper and which pipe would be of sufficient diameter to have an unthrottled contact material flow capacity somewhat greater than the maximum amount of contact material flow from the elutriator. Since only a drain pipe having slightly more flow capacity than the maximum flow of contact material from the elutriator could be safely used such a pipe would be generally only partially filled with flowing contact material, and a general inability to fully and accurately prevent flow of gases in either direction through such pipe might be risked. This prevents the use of the conventional draining method for this type of an application.

A major object of this invention is the provision in a system wherein a particle-form solid contact mass material is passed cyclically through at least two zones at least in one of which it moves slowly downwardly as a substantially compact bed of contact material which bed is continuously replenished with contact material and over which bed a gaseous pressure is maintained and wherein a second stream of contact material is scrubbed in a suitable scrubbing zone above said moving bed, of a method for continuously transferring scrubbed contact material from the scrubbing zone to a location under said moving bed while substantially preventing flow of gas with or against contact material being so transferred.

Figure 2:
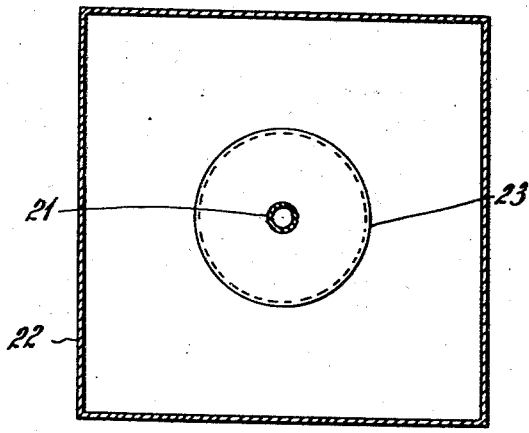
Figure 3:
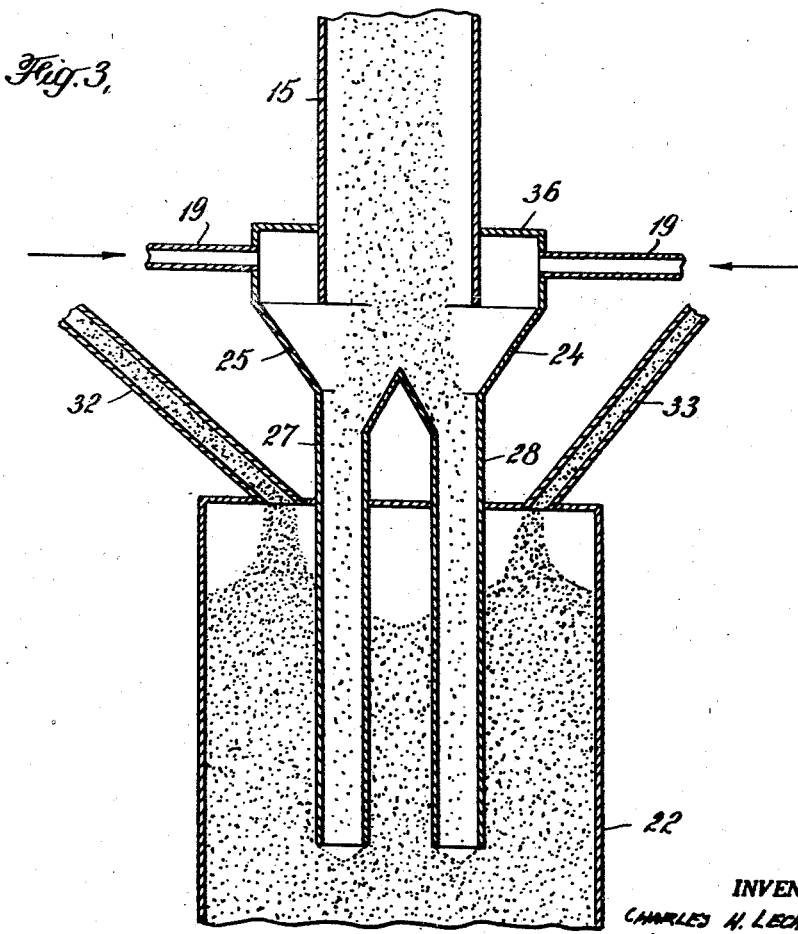

In order to readily understand this invention reference is made to the drawings attached hereto in which Figure 1 shows a sectional elevation view of an elutriator assembly with a preferred means for draining the scrubbed contact material therefrom. Figure 2 is to be used with Figure 1 and shows a sectional plan view of the draining means within a receiving vessel or hopper. Figure 3 is a sectional elevation view of the lower end of an elutriator and of a somewhat less desirable method within the invention of accomplishing draining of the contact material, namely the use of two or more large diameter drain pipes. Figure 4 is a sectional view showing the construction and arrangement of a modification of the preferred type of contact material drain from the elutriator to the receiving hopper. All of these drawings are diagrammatic in character.

Turning now to Figure 1, we find that 15 is the shell of a vertical elutriator near the top of which contact material is charged through pipe 16 and distributed across the elutriator cross section by the conical baffle 17 supported by rods 18. Connected concentrically to and near the lower end of the elutriator shell 15 is the cylindrical air or flue gas inlet section 36 with the air or flue gas inlet pipes 19. The lower end of section 36 is swaged so as to form the conical contact material drain entrance 20, from the lower end of which is suspended the drain pipe 21. The drain pipe 21 extends down into the regenerator surge hopper 22 and terminates in an inverted cone 23 which is attached thereto and which is open on the bottom; this cone and the end of pipe 21 are positioned so as to be well under the minimum level of the bed of contact material in the hopper. The hopper may be supplied with vent pipe 29 and will have contact material inlet pipe 32 through which that fraction of the total material circulation of the reactor-regenerator cyclic system that is not passed through the elutriator is charged. Figure 2 is a sectional plan view looking down into the surge hopper 22 onto the conical baffle 23 connected to the end of the drain pipe 21.

Turning again to Figure 1 for a study of the operation of this apparatus, the air or flue gas enters through inlets 19 in the section 36 and passes under the lower edge of the elutriator shell 15 around its entire periphery and then passes up through the elutriator countercurrent to the downward raining contact material. The undersized contact material is floated and carried by the air or flue gas up past the inlet distribution baffle 17 and out from the top of the elutriator. The scrubbed contact material of usable size range settles into the conical drain entrance 20 and then through the drain pipe 21 into the regenerator surge hopper 22. The end of the elutriator drain pipe 21 and the conical baffle 23 attached thereto extend far enough down into the surge hopper 22 so as to be always well under the surface of the contact material in the hopper so that the bed of contact material above the outlet end of the conical baffle serves as a seal which prevents the flow of appreciable quantities of the scrubbing vapor down through the drain pipe 21 rather than up through the elutriator. If the conical baffle 23 is not used, it has been discovered that the flow of contact material down through the drain pipe 21 is throttled by the moving bed of contact material in which the end of the drain pipe 21 is immersed and the linear rate of contact material flow through the drain pipe 21 will not be substantially greater than the low linear rate of flow of the contact material down through the surge hopper even though the pipe 21 were full of contact material up to the conical inlet thereto, 20. In other words no more contact material can flow from the end of pipe 21 than is removed downward from a cross section of the contact bed in the hopper immediately below the end of pipe 21 and of an area substantially equal to the projected cross sectional area of the end of the pipe 21. Generally the quantity of contact material continuously passed through the elutriator is such that, in order to permit continuous and complete draining of said material from the elutriator through a drain line in which the linear rate of flow of the contact material would be about equal to that of the material in the surge hopper, a very large diameter drain pipe would be required which might in some instances be of larger diameter than the elutriator shell 15. This would usually be cumbersome and uneconomical. Hence an inverted conical baffle 23 is attached to the end of the drain pipe, the lower end of which baffle controls a considerably greater cross section of the bed of material in the hopper than the end of pipe 21. Thus the quantity of material that can be withdrawn per unit of time from pipe 21 has been increased approximately by the ratio of the projected area of the bottom of the cone 23 to that of the end of the drain pipe 21, and the use of a conical baffle having a base of sufficient projected area will permit the complete and continuous draining of contact material from the elutriator through a relatively small diameter drain pipe. The baffle 23 does not necessarily have to be conical in shape, but may be of any desirable shape provided its lower end provides sufficient projected area. In fact, although not preferable, the use of a flat plate attached perpendicularly to the drain pipe just above its outlet end would serve the same purpose as the conical baffle. It should be noted here that when such baffles are used the drain pipe does not operate full of catalyst, except perhaps for a short length at the lower end, since the pipes are of more than adequate size to handle the maximum contact material flow from the elutriator were they not throttled on the end by the contact material bed in the hopper.

As stated above, the use of a single very large drain pipe would also serve as an adequate, though cumbersome drain for the elutriator. Similarly two large drain pipes, the total projected area of the ends of which are sufficient, could be used. Such an arrangement is shown in Figure 3 in which the lower end of the elutriator 15 connects into the vapor feed section 36 having vapor feed pipes 19 to the bottom of which section are connected two conical draw-off entrances 24 and 25 from which are suspended the two large diameter drain pipes 26 and 27 respectively. These pipes extend down into the contact material bed in the surge hopper 22 and the total projected area of the ends of these pipes is sufficient to permit flow therefrom into the bed of contact material of the total material throughput through the elutriator. Except where the rate of contact material flow through the elutriator is very low, such an arrangement as shown in Figure 3 is a cumbersome and is not a preferable form of this invention.

Turning now to Figure 4, we find the elutriator shell 15, the vapor inlet section 36 with vapor inlet pipes 19 and the conical drain entrance 20, from which is suspended the drain pipe 21. The required projected area at the outlet end of this drain pipe is obtained by connecting the end of pipe 21 into two substantially larger pipes 30 and 31 so as to form an inverted Y. The pipes 30 and 31 are of sufficient size so that the sum of the projected area of their outlet ends is adequate to permit draining therefrom into the contact material bed, the maximum contact material throughput of the elutriator.

Since the relative quantities of contact material passed through the elutriator and that charged directly from the cyclic system conveyor to the surge hopper will vary depending upon the operation conditions and total contact material circulation rate in the cyclic system as well as upon the rate of attrition of the contact material in the cyclic system, it is not possible to arbitrarily specify any set dimensions for the baffles or elutriator drain pipes. However, once knowing the cyclic system operation variables, a certain limiting range of contact material flow rates through the elutriator may be set and then the required size of the drain pipe and baffle can be calculated or experimentally determined. Thus it can be said that the drain pipe should be of such size as would have an unthrottled free flow capacity either equal to or higher than the maximum flow of contact material through the elutriator. Also the maximum volume per unit of time of contact material charged through the elutriator should be equal to or preferably a little less than the product AV, that is, (the projected area of the outlet ends of the drain pipe or pipes or baffles connected thereto) multiplied by (the lowest linear rate of flow of contact material down through the bed in the surge hopper or receiving vessel that may be encountered in the cyclic system operation). It can be further said that in order to provide an adequate vapor seal at even small pressure differentials, the outlet end of the elutriator drain pipe or pipes or baffles attached thereto should be never less than about six inches below the surface of the contact material bed in the surge hopper.

It should be understood that all the above sketches are purely diagrammatic in character and are not to be construed as limiting this invention either as to the types of construction shown or as to the location of application of the invention.

We claim:

1. In a system wherein a particle-form solid contact mass material is flowed cyclically through at least two zones, in one of which it moves slowly downwardly at a linear rate V per unit of time as a compact bed over the surface of which bed is maintained a gaseous atmosphere, and in which a portion of the cyclically flowing solid is diverted prior to entry to said bed-zone and subjected to scrubbing in a scrubbing zone with a gaseous atmosphere to remove undersized material, the method of introducing cleaned solid to said bed-zone while substantially preventing gaseous flow between said scrubbing zone and said atmosphere over the surface of said bed, which comprises the steps: directing the cleaned solid from said scrubbing zone as a confined stream of freely falling solid particles to a location in said bed-zone substantially below the surface thereof, said stream being of substantially less cross-sectional area than said bed-zone, and increasing the cross-sectional area of said stream at said location within said bed to such an extent that said increased area is at least equal to the quotient $$\frac{U}{V}$$

where U is the volume of solid, measured as a compact mass, freely falling in said stream per unit of time.

2. In a system wherein a particle form solid contact mass material is passed cyclically through at least two zones over one of which it is maintained as a substantially compact bed of downwardly gravitating solid particles over the surface of which bed is maintained a gaseous atmosphere the method of operation which comprises: directing a stream of contact material onto the surface of said bed to replenish said bed, directing a second stream of solid particles into the upper section of an elongated substantially vertical scrubbing zone located above said bed, passing said second stream of solid downwardly through said scrubbing zone as a freely falling stream of particles while passing a scrubbing gas countercurrently through said stream of falling particles to scrub therefrom undersized particles, directing said stream of particles from the lower end of said scrubbing zone as a confined stream of freely falling particles to a predetermined location of entry substantially below the surface of said bed of moving solid, said last named stream being of substantially less cross-sectional area than said bed of solid, deflecting by baffles the flow of the solid material in said bed immediately surrounding the lower end of said predetermined location or entry within said bed in such a manner as to enlarge the cross-sectional area of said stream to such an extent as to prevent any substantial throttling action on the part of said bed on the free fall of solid particles in said last named confined stream above said location of entry.

CHARLES H. LECHTHALER.
JOHN W. PAYNE.

REFERENCES CITED
The following references are of record in the file of this patent:

UNITED STATES PATENTS

| Number | Name | Date |
| --- | --- | --- |
| 1,819,756 | Reed | Aug. 18, 1931 |
| 2,304,128 | Thomas | Dec. 8, 1942 |